United States Patent [19]
Angelucci, Jr.

[11] 3,837,885
[45] Sept. 24, 1974

[54] CATHODE RAY TUBE MANUFACTURE

[75] Inventor: Louis J. Angelucci, Jr., Norristown, Pa.

[73] Assignee: Philco-Ford Corporation, Philadelphia, Pa.

[22] Filed: Aug. 17, 1972

[21] Appl. No.: 281,464

Related U.S. Application Data

[63] Continuation of Ser. No. 63,823, Aug. 14, 1970, abandoned.

[52] U.S. Cl. .............. 117/33.5 CM, 96/1.2, 96/36, 96/36.1, 313/92 B
[51] Int. Cl. ............................................ G03c 5/00
[58] Field of Search 117/33.5 CM, 33.5 C, 33.5 CP; 96/36.1, 36, 1.2

*Primary Examiner*—Ralph Husack
*Assistant Examiner*—William R. Trenor
*Attorney, Agent, or Firm*—Harry W. Hargis, III; Robert D. Sanborn; Carl H. Synnestvedt

[57] ABSTRACT

A process of manufacturing color image screens of the type comprising a multiplicity of triplets of tri-color phosphor dots adherent to a glass substrate and spaced from each other by intermediate light absorbing screen areas. A layer of photo-bondable material is deposited, exposed, and developed, whereby to provide on the substrate dots of photo-bondable material occupying elemental areas corresponding in size and location to the desired phosphor dots. A layer of light absorbing material is then applied across the substrate and across said elemental areas, after which a debonding agent is used which is effective to loosen the photo-bonded material remaining in said elemental areas and cause the same to break free from the substrate in the form of minute individual platelets which carry with them the light absorbing material which overlies the same. This exposes elemental substrate areas in a dark matrix, and the desired phosphor dots are formed by depositing in these areas phosphors of the desired fluorescence.

1 Claim, 6 Drawing Figures

INVENTOR.
LOUIS J. ANGELUCCI JR.
BY

AGENT

3,837,885

CATHODE RAY TUBE MANUFACTURE

CROSS-REFERENCE TO RELATED APPLICATION

This application is a continuation of application Ser. No. 63,823, filed Aug. 14, 1970, and now abandoned.

BACKGROUND OF THE INVENTION

This invention relates to color cathode ray tubes and especially to a process for manufacturing tubes of the type in which each of the color dots which comprise the image screen is surrounded by opaque, preferably black, material. Tube screens of this kind present a number of advantages. For example, phosphor of each color can be deposited in a single operation, rather than deposited in step-by-step fashion. Also, the black opaque material makes it possible to increase the transmissivity of the glass substrate while still maintaining good screen contrast. Glass of high transmissivity, in turn, enhances the radiance of the phosphors. It is also recognized that the black material makes possible more guard-band per dot, and therefore allows the electron beam to be larger than the applied dot. The result of this combination of high transmissivity glass, large electron beam, and black opaque material, is a significant increase in light output without a loss in contrast.

It has been known, in the manufacture of such screens, to use a conventional rejection masking process in which an ordinary photoresist, for example KPR, is applied to the substrate in a pattern of elemental areas corresponding in size and location to the desired phosphor dots, then to apply black or other light absorbing material across the entire substrate including such elemental areas, and finally to wash, or dissolve, the photoresist material from the substrate, using a suitable solvent, whereby to expose said elemental areas in a matrix of light absorbing material. Deposition of the phosphors completes the known process.

While advantageous, this known process has presented difficulties. Important among these difficulties is the fact that removal of the photoresist material by dissolution necessarily is a gradual process difficult to control so precisely as to avoid erosion of the surrounding black matrix without leaving a residue which deleteriously affects the subsequent deposition of phosphors.

SUMMARY OF THE INVENTION

My invention is based on recognition of the fact that it is possible to provide dot-receiving, elemental areas in the exposed black matrix in a cleaner, faster and more precise way. It is, therefore, the general objective of the invention to provide an improved process for manufacturing black-matrix image screens, in which process a photo-bondable material is used to define the elemental areas in which the phosphor is to be deposited, and this material is removed by a clean and very precise process in which the photo-bonded material is loosened from the substrate and caused to break or "pop" free in discrete masses, or individual platelets, thus exposing the substrate in the pattern required for reception of the phosphors. This process leaves no residues and results in unusually precise definition of the dot pattern in the matrix.

DETAILED DESCRIPTION OF THE PROCESS

Figure 1:
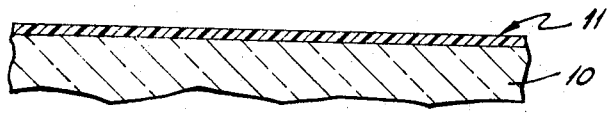
FIGS. 1 through 6 are fragmentary sectional views of a glass substrate, illustrating the process steps of my invention in their flow sequence.

The process will now be described with reference to the drawing, after which certain steps are considered in greater detail, and specific examples of the composition of the various mixtures are given.

Figure 2:
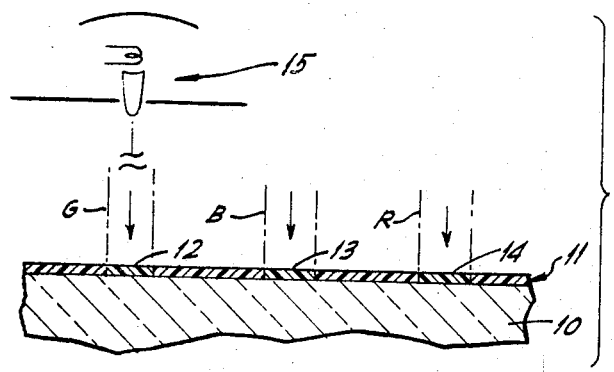

First making reference to FIG. 1, an enlarged section of the cathode ray tube faceplate panel, or glass substrate, is shown at 10. This faceplate is coated with a layer or film 11 of photo-bondable material, which may comprise for example a mixture of polyvinyl alcohol (PVA), dibasic calcium phosphate and ammonium dichromate. The PVA serves as a binder, the calcium phosphate insures a good bond with the glass, and the ammonium dichromate comprises a light sensitizer. This film is dried and subjected to actinic light to expose portions 12, 13 and 14 of said layer 11. As shown diagrammatically in FIG. 2, this operation takes place in a "lighthouse" of known design which includes a high intensity point source of light 15 arranged to direct light toward and over the confronting surface of a shadow mask (not shown) which overlies the faceplate 10. In accordance with conventional practice, three exposures are made, each with different relative positioning between the light source 15 and the faceplate 10. For each exposure, the light is caused to impinge upon a small circular area of the film 11, fixing a very minute dot. These exposures are made sequentially and in a pattern comprising elemental areas G, B and R which correspond in size and location to the dots of green, blue and red phosphor which will ultimately be applied to the tube screen.

Figure 3:
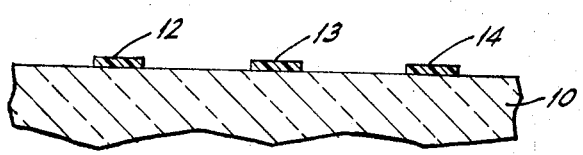

As shown in FIG. 3, and as described in more detail in Example 1 given below, the layer 11 of photo-bondable material is developed to remove all portions except the photo-bonded portions 12, 13 and 14 which are situated in the elemental areas ultimately to be occupied by the green, blue and red dots of phosphor.

Figure 4:
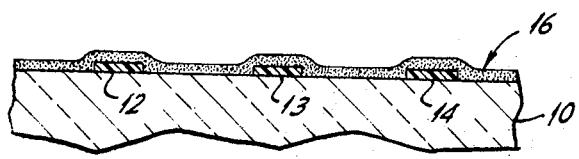

As appears in FIG. 4, a layer of light absorbing material 16 is then applied across the substrate and across the photo-bonded dots 12, 13 and 14. As explained below, the layer 16 may comprise a mixture of lampblack, isopropyl alcohol and water, and is dried after application, forming a thin film.

Figure 5:
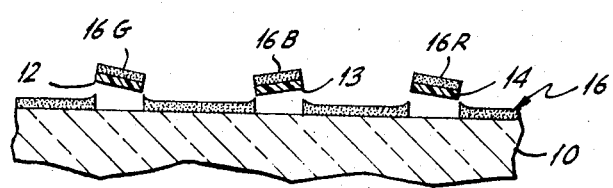

In particular accordance with the invention, the layer of light absorbing material is removed from the elemental areas which are ultimately to be occupied by green, blue and red phosphors, by applying an agent effective to cause the photo-bonded material in the areas 12, 13 and 14 to break free from the substrate 10 in discrete masses or platelets. This action is clear from FIG. 5 from which it will be appreciated that the individual platelets of photo-bonded material 12, 13 and 14 virtually "pop" from the substrate carrying with them portions of the overlying light-absorbing layer 16, which portions are shown at 16G, 16B and 16R.

By this very simple process, which is clean, fast and precise, the platelets are freed from the substrate in a manner leaving no residue. The process results in an unusually precise definition of the dot pattern desired in the black matrix. Importantly there is no erosion of the surrounding black matrix layer 16 as commonly resulted in previous processes involving extended washing or dissolution steps.

Figure 6:
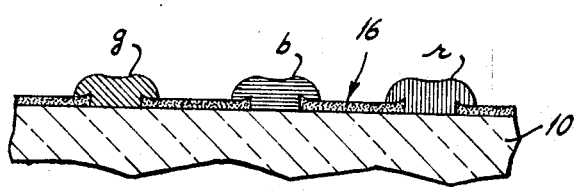

The final phosphor dots, or buttons, shown at g, b and r, in FIG. 6, are applied in a manufacturing sequence which is well known in this art and requires no detailed explanation herein. It is sufficient to point out that a photosensitive phosphor slurry or spray (not shown) is applied to the faceplate panel 10, a mask is mounted in proper position, and a photosensitive phosphor is exposed in a lighthouse. The unexposed material is then removed. This sequence, and subsequent washings, is followed at least once for each of the three phosphors which comprise the mosaic screen. The result of the entire process is the provision of a tube screen having a multiplicity of phosphor dots of the kind shown in FIG. 6, arranged in tri-color triplets set in a black matrix.

The composition and preparation of materials found to be suitable is given in the following examples.

EXAMPLE 1

A photosensitive composition was prepared by mixing the following ingredients:

| | | |
|---|---|---|
| polyvinyl alcohol (40 CPS/20° C) | ml | 100. |
| calcium phosphate dibasic, 36% suspension | ml | 36. |
| ammonium dichromate, 18% solution | ml | 1. |

Sufficient material was applied to a clean dry faceplate panel to provide a uniform thin coat after the panel was spun at 170 rpm for 4 minutes in a dry air atmosphere. Such materials can also be applied by spray techniques.

Standard lighthouses were used to expose the coated panel, one exposure for each color of phosphor in the dot pattern ultimately to be formed. The exposed panels were developed by subjecting them to an atomized spray of de-ionized water which removes all of the unexposed material, leaving the photo-bonded dots.

A black coating material was prepared by mixing the following ingredients in a blender:

| | | |
|---|---|---|
| lampblack, 13 millimicron particles (available commercially from the Columbian Carbon Company as Neo Spectra Mark II) | g | 25. |
| isopropyl alcohol | ml | 400. |
| de-ionized water | ml | 600. |

Sufficient black coating material was air sprayed onto the panel to produce a uniform coat 3 microns thick.

A dot removal solution was prepared as follows:

| | | |
|---|---|---|
| sodium phosphate tribasic, 10% solution | ml | 50. |
| hydrogen peroxide, 1.5% solution | ml | 200. |

This solution was swirled over the panel for 30 seconds. It was found that all of the photo-bonded dots were removed, cleanly and without residue, leaving a black coating on the panel except where phosphor dots are to be applied in subsequent processing steps. After completion the color tube had a dense black opaque coating as a background between the phosphor dots. The processing had no adverse effect on the application or performance of the three color phosphors.

EXAMPLE 2

The process of Example 1 was followed except that the dot removal solution was applied as an atomized air spray which provided even more effective dot removal action.

EXAMPLE 3

The process of Example 1 was followed, but the dot removal solution was replaced with a solution of 22 percent hydrogen peroxide. Dot removal was complete after 5 minutes.

EXAMPLE 4

The process of Example 1 was followed, but the lampblack was replaced with 2 ½ micron particle size graphite employed in the form of an aqueous suspension. This material is marketed by Acheson Colloids Company as Aquadag, and by Joseph Dixon Crucible Company as Suspension No. 121. It was found that graphite provides the desirable qualities of lampblack and has the advantage that it will withstand higher tube processing temperatures in subsequent operations such as bake out, frit sealing, and the like.

I claim:

1. In a photodeposition process for manufacturing a color image screen for a cathode ray tube, said screen to comprise a multiplicity of triplets of tri-color phosphor dots adherent to a glass substrate and spaced from each other by intermediate light absorbing screen areas, including the steps which comprise: depositing on the substrate a layer of photobondable material composed essentially of, substantially in the proportions indicated by volume, polyvinyl alcohol (40 CPS/20° C) — ml 100, calcium, phosphate dibasic, 36 percent suspension — ml 36, ammonium dichromate, 18 percent solution — ml 1; photo-bonding portions of said layer to said substrate in a pattern comprising elemental areas corresponding in size and location to the desired phosphor dots; selectively removing portions of said layer to leave the photo-bonded portions occupying said elemental areas; applying a layer of light absorbing material across said substrate including said elemental areas; and removing said light absorbing material from said elemental areas, the improvement wherein said step of removing said light absorbing material comprises applying an agent, composed of a dilute aqueous solution the solutes of which consist essentially of, substantially in the proportions indicated by volume, sodium phosphate tribasic, 10 percent solution — ml 50, and hydrogen peroxide, 1.5 percent solution — ml 200, said tribasic sodium phosphate and hydrogen peroxide being effective to cause the photo-bonded material in said areas to break free from the substrate in discrete masses carrying with them the overlying light absorbing material.

* * * * *